July 2, 1957  B. BARÉNYI  2,797,953
PASSENGER MOTOR VEHICLE WITH A PONTOON-LIKE BODY
Filed Dec. 29, 1952
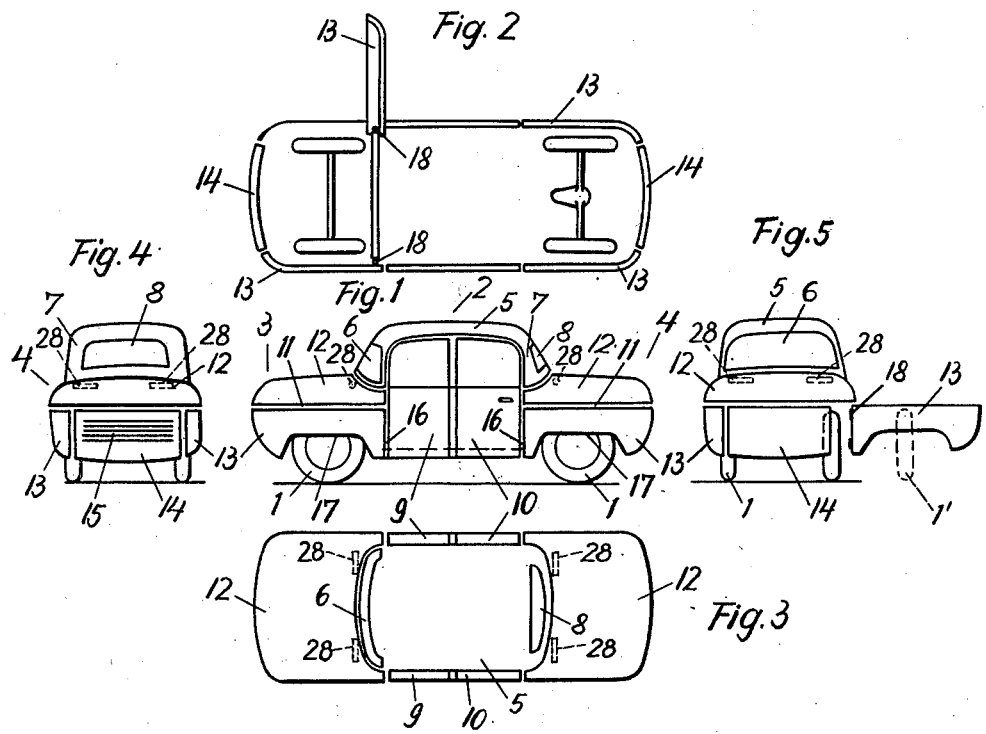
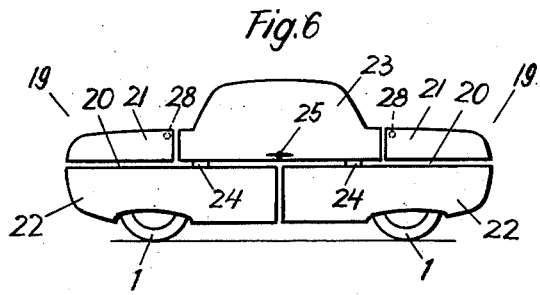
Inventor
Béla Barényi
By: Dieke and Padlon
Attorneys

United States Patent Office 2,797,953
Patented July 2, 1957

2,797,953
PASSENGER MOTOR VEHICLE WITH A PONTOON-LIKE BODY

Béla Barényi, Stuttgart-Rohr, Germany, assignor to Daimler-Benz Aktiengesellschaft, Stuttgart-Untertürkheim, Germany Application December 29, 1952, Serial No. 328,369

Claims priority, application Germany December 31, 1951

3 Claims. (Cl. 296—28)

The invention relates to passenger motor vehicles with pontoon-like bodies.

An object of the invention is an advantageous construction of the bodies of passenger motor vehicles, particularly a simplified and cheaper manufacturing of the components of the bodies.

Another object of the invention is to simplify the removing and replacing of the road wheels which are surrounded on the outside thereof by the side walls of the pontoon-like body.

Further objects and advantages of the present invention will be apparent to those skilled in the art from the following description of the annexed sheet of drawing, which by way of preferred examples shows two embodiments of the invention. It will be understood, however, that the invention is not limited to the illustrated embodiments.

In the drawing:

Fig. 1 is a side view of a passenger motor vehicle according to the first embodiment in accordance with the present invention, Fig. 2 is a view of the same passenger motor vehicle seen from the bottom;

Fig. 3 is a top view of the same passenger motor vehicle;

Fig. 4 is a rear view, and

Fig. 5 a front view of the same passenger motor vehicle, and

Fig. 6 is a side view of a passenger motor vehicle according to the second embodiment in accordance with the present invention.

In Figures 1, 2, 3, 4 and 5 the reference numeral 1 designates the road wheels, 2 the central section of the body, and 3, 4 designate the two end sections of the same. The central section 2 is composed of a roof part 5 having a windshield 6 in front, and a rear wall 7 with a window pane 8. On either side the central section is limited by the two doors 9, 10. The two end sections 3, 4 have the same shape, and are so designed that each is separated or split into a lower and an upper part by a horizontal separating joint 11. The upper part consists of a hood 12, advantageously designed so as to be movable, for instance, by means of appropriate hinges of any suitable conventional construction which are shown in the drawing schematically and designated therein by reference numeral 28. The lower part consists of two side parts 13, the middle part 14 being arranged between these side parts 13. The middle part 14, for instance, in the rear end section, in which an engine is housed (not shown) can be provided with air outlets 15 in the form of a lattice arrangement. The two end sections are limited by the door joints 16 in the longitudinal direction. The side parts 13 can be cut out at their lower edges at 17 so as to provide limit stops for the road wheels. When necessary, the side parts 13 may be designed to be hinged by means of hinges 18 about an axis running parallel to the door joint or within the same. This arrangement permits the road wheels to be easily removed and replaced as indicated at 1' in Fig. 5.

In the case of a passenger motor vehicle as illustrated in Fig. 6, showing the body and the road wheels 1, the end sections of the body have the same shape and are separated or split by a horizontal separating joint 20 extending over the entire length of the body so as to represent an upper part 21 and a lower part each. In this case the four side parts 22 of the lower part which are joined by middle parts (not shown) similar to the middle parts 14 of the embodiment according to Figures 1 through 5 and shown in Figures 2, 4, and 5, are designed so as to meet in the transverse plane where they are either rigidly connected or removably connected so as to be able to be separated from each other. Between the hood-like upper parts 21 there is arranged a body 23 being able to be swung by way of hinges 24 toward one of the two longitudinal sides by means of a handle 25 after the locking device arranged on the opposite side has been released, the handle 25 being located on the longitudinal side of the vehicle opposite the side of the hinges 24.

What I claim is:

1. In a passenger motor vehicle with one pair each of spaced front and rear wheels, a pontoon-shaped vehicle body symmetrically arranged with respect to the central transverse plane of the vehicle, said pontoon-shaped body comprising a center section forming at least in part the passenger space, and one split end section connected to the front end of said center section and one split end section connected to the rear end of said center section, said end sections having the same shape and each including a hood-like upper part and a lower part with an essentially horizontal separating joint formed therebetween, said lower part including two side parts encasing at least partially a respective one of said vehicle wheels and a middle part joining said two side parts, and means for hingedly supporting said side parts on said vehicle to enable removal of said wheels, which are normally covered at least partially by said side parts, in an axial direction outwardly of the vehicle upon pivotal movement of said side parts.

2. In a passenger motor vehicle, a pontoon-shaped vehicle body according to claim 1, wherein said center section includes vehicle doors forming a door joint with a respective one of said end sections, and wherein the axis of said pivot means is disposed parallel to said door joint to provide for pivotal movement of said side parts about essentially vertical axes.

3. In a passenger motor vehicle, a pontoon-shaped vehicle body according to claim 1, wherein said side parts of each vehicle side extend in the longitudinal direction of the vehicle up to said central transverse plane, and wherein said center section forms a hood-like roof part over the portions of said side parts within the area of said passenger space, and means for pivotally securing said roof part to said vehicle to enable pivotal movement of said roof part for purposes of ingress and egress to and from the vehicle passenger space.

References Cited in the file of this patent

UNITED STATES PATENTS

| 2,177,793 | Taylor | Oct. 31, 1939 |
| 2,413,792 | Sharp | Jan. 7, 1947 |
| 2,582,839 | Lippard et al. | Jan. 15, 1952 |
| 2,584,576 | Gould | Feb. 5, 1952 |
| 2,588,643 | Maxwell | Mar. 11, 1952 |
| 2,656,214 | Alamagny | Oct. 20, 1953 |

FOREIGN PATENTS

| 577,690 | France | June 11, 1924 |
| 597,843 | France | Sept. 11, 1925 |
| 928,344 | France | June 2, 1947 |
| 550,603 | Great Britain | Jan. 15, 1943 |
| 471,987 | Italy | June 3, 1952 |